(12) United States Patent
Honda et al.

(10) Patent No.: US 10,903,500 B2
(45) Date of Patent: Jan. 26, 2021

(54) BATTERY AND CELL STACK

(71) Applicant: Panasonic Intellectual Property Management Co., Ltd., Osaka (JP)

(72) Inventors: Kazuyoshi Honda, Osaka (JP); Akira Kawase, Osaka (JP); Kouji Nishida, Osaka (JP); Akio Kaneyama, Osaka (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/579,841

(22) Filed: Sep. 24, 2019

(65) Prior Publication Data

US 2020/0119363 A1 Apr. 16, 2020

(30) Foreign Application Priority Data

Oct. 10, 2018 (JP) .................. 2018-191765

(51) Int. Cl.
*H01M 4/70* (2006.01)
*H01M 2/10* (2006.01)
*H01M 10/04* (2006.01)
*H01M 2/08* (2006.01)

(52) U.S. Cl.
CPC .............. *H01M 4/70* (2013.01); *H01M 2/08* (2013.01); *H01M 2/1077* (2013.01); *H01M 10/04* (2013.01)

(58) Field of Classification Search
CPC ...................................... H01M 4/70
USPC ......................................................... 257/185
See application file for complete search history.

(56) References Cited

U.S. PATENT DOCUMENTS

| 2013/0095388 A1 | 4/2013 | Nakamoto |
| 2015/0111088 A1 | 4/2015 | Hiroki et al. |
| 2018/0024102 A1* | 1/2018 | Fukuoka ............... G01N 31/224 |
| | | 429/57 |

FOREIGN PATENT DOCUMENTS

| JP | 2013-178996 | 9/2013 |
| JP | 2016-027532 | 2/2016 |
| JP | 2016-033880 | 3/2016 |
| JP | 2017-073374 | 4/2017 |
| WO | 2011/086664 | 7/2011 |
| WO | WO-2018025649 A1 * | 2/2018 ........ H01M 10/0562 |

* cited by examiner

*Primary Examiner* — Ajay Arora
(74) *Attorney, Agent, or Firm* — Greenblum & Bernstein, P.L.C.

(57) ABSTRACT

A battery includes a unit cell, which includes an electrode layer and a counter electrode layer facing the electrode layer, an electrode current collector in contact with the electrode layer, a counter electrode current collector in contact with the counter electrode layer, and a seal between the electrode current collector and the counter electrode current collector. The unit cell is disposed between the electrode current collector and the counter electrode current collector. At least one selected from the group consisting of the electrode current collector and the counter electrode current collector has at least one recess facing the seal.

20 Claims, 11 Drawing Sheets

BATTERY AND CELL STACK

BACKGROUND

1. Technical Field

The present disclosure relates to a battery and a cell stack.

2. Description of the Related Art

Japanese Unexamined Patent Application Publication No. 2017-73374 discloses a structure in which a positive electrode layer and a negative electrode layer have a larger thickness near their central portions in the plane direction than near their outer areas in the plane direction. Japanese Patent No. 5553072 discloses a structure that includes a seal for preventing the outflow of a liquid hydrophobic phase transition substance. Japanese Unexamined Patent Application Publication No. 2016-33880 discloses a seal composed of a sealing material for sealing exposed portions of a positive electrode sheet, a solid electrolyte layer, and a negative electrode layer.

SUMMARY

In one general aspect, the techniques disclosed here feature a battery that includes a unit cell, which includes an electrode layer and a counter electrode layer facing the electrode layer, an electrode current collector in contact with the electrode layer, a counter electrode current collector in contact with the counter electrode layer, and a seal between the electrode current collector and the counter electrode current collector. The unit cell is disposed between the electrode current collector and the counter electrode current collector. At least one selected from the group consisting of the electrode current collector and the counter electrode current collector has at least one recess facing the seal.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Outline of Present Disclosure

Figure 1:
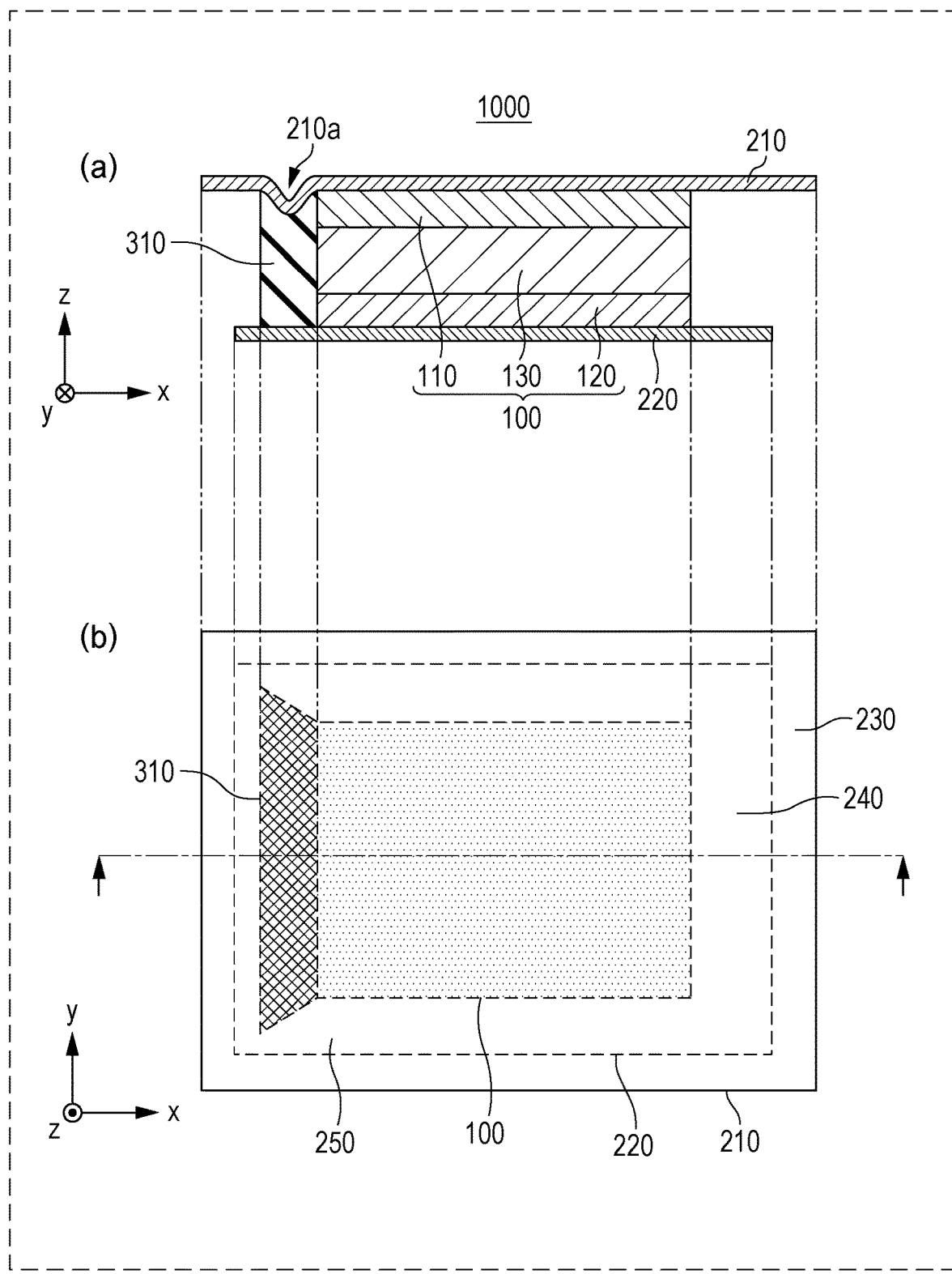
FIG. 1 is a schematic view of a battery according to a first embodiment.

A battery according to one aspect of the present disclosure includes a unit cell, which includes an electrode layer and a counter electrode layer facing the electrode layer, an electrode current collector in contact with the electrode layer, a counter electrode current collector in contact with the counter electrode layer, and a seal between the electrode current collector and the counter electrode current collector. The unit cell is disposed between the electrode current collector and the counter electrode current collector. At least one selected from the group consisting of the electrode current collector and the counter electrode current collector has at least one recess facing the seal.

This can improve the reliability of the battery. For example, the recess improves the mechanical strength of the electrode current collector. The recess facing the seal ensures the volume of the unit cell or the electric-power generating element. Thus, the recess can ensure the volume of the electric-power generating element and improve the mechanical strength of the battery.

The seal may be in contact with the electrode current collector and the counter electrode current collector.

In such a case, the seal can keep at least a certain distance between the electrode current collector and the counter electrode current collector (for example, a distance greater than or equal to the thickness of the seal). In other words, the seal can prevent the electrode current collector and the counter electrode current collector from approaching each other and can thereby reduce the risk of a short circuit between the electrode layer and the counter electrode layer due to direct contact between the electrode current collector and the counter electrode current collector.

The seal may be in contact with the unit cell.

In such a case, the seal can protect a side surface of the unit cell or the electric-power generating element. For example, the seal can prevent an electrode material in the electrode layer, a counter electrode material in the counter electrode layer, and a solid electrolyte material in the electrolyte layer from partly collapsing.

The seal may surround the unit cell.

In such a case, the seal can keep at least a certain distance between the electrode current collector and the counter electrode current collector (for example, a distance greater than or equal to the thickness of the seal) around the unit cell or the electric-power generating element. Thus, the seal can prevent the electrode current collector and the counter electrode current collector from approaching each other around the electric-power generating element.

Furthermore, even when one of the electrode current collector and the counter electrode current collector is deformed around the electric-power generating element, the seal can prevent the deformed portion from coming into contact with the other of the electrode current collector and the counter electrode current collector. These can further reduce the risk of a short circuit between the electrode layer and the counter electrode layer.

The at least one recess may have a depth 1 to 100 times the thickness of the at least one selected from the group consisting of the electrode current collector and the counter electrode current collector.

Limiting the depth of the recess to such a range can prevent the breakage of the electrode current collector or the counter electrode current collector.

The at least one recess may be located inside an end of the at least one selected from the group consisting of the electrode current collector and the counter electrode current collector.

This enables a plurality of recesses to be easily formed, and the plurality of recesses can certainly further improve the strength of the battery.

The at least one recess may include a plurality of recesses.

This can certainly further improve the strength of the battery.

A portion of the at least one recess may be inclined at an angle of 15 degrees or more with respect to a main surface of the at least one selected from the group consisting of the electrode current collector and the counter electrode current collector.

This can enhance the bending effects of the electrode current collector and certainly improve the strength of the battery.

The unit cell may include a solid electrolyte layer between the electrode layer and the counter electrode layer.

This can provide a solid cell with improved reliability.

The solid electrolyte layer may cover at least one selected from the group consisting of the electrode layer and the counter electrode layer.

This can reduce the decrease in battery capacity due to the collapse or isolation of the electrode layer or the counter electrode layer.

The solid electrolyte layer may be in contact with at least one selected from the group consisting of the electrode current collector and the counter electrode current collector.

This can protect part of the electrode layer or part of the counter electrode layer.

When the battery is viewed in the thickness direction, the electrode current collector may include a first region that does not overlap the electrode layer, the first region includes at least part of the outer circumference of the electrode current collector, the counter electrode current collector may include a second region that does not overlap the counter electrode layer, the second region includes at least part of the outer circumference of the counter electrode current collector, and the seal may overlap the first region and the second region.

In such a case, the seal can more strongly keep at least a certain distance between the electrode current collector and the counter electrode current collector (for example, a distance greater than or equal to the thickness of the seal) around the unit cell or the electric-power generating element. Thus, the seal can more strongly prevent the electrode current collector and the counter electrode current collector from approaching each other and can thereby further reduce the risk of a short circuit between the electrode layer and the counter electrode layer due to direct contact between the electrode current collector and the counter electrode current collector.

Furthermore, when the battery has a volume change during use or even when the battery is subjected to an impact from the outside, the seal can shift the stress caused by these phenomena to the internal space and thereby relieve the stress. Thus, the seal can reduce the risk of breakage, such as delamination or cracking, in the battery (in particular, a battery with no separator between the electrode layer and the counter electrode layer).

The seal may contain a first material, and the first material may be an electrically insulating material having no ion conductivity.

The insulating first material can prevent electrical conduction between the electrode current collector and the counter electrode current collector. The first material having no ion conductivity can reduce the degradation of battery characteristics due to contact between the seal and a seal of another battery, for example.

The first material may contain a resin.

When the battery is subjected to an external force or is exposed to a wet atmosphere or a gas component, due to its flexibility, pliability, or gas barrier properties, the seal containing a resin (for example, a sealant) can further reduce adverse effects on the unit cell or the electric-power generating element. This can further improve the reliability of the battery.

The first material may be at least one selected from the group consisting of epoxy resins, acrylic resins, polyimide resins, and silsesquioxanes.

In such a case, the seal can be formed of a curable material, for example. More specifically, the first material in the seal initially has flowability, and upon ultraviolet radiation or heat treatment, for example, the first material loses flowability and can be cured. If necessary, the thickness of the seal can be easily maintained through temporary curing by heat treatment or ultraviolet radiation or through curing by heat treatment.

The seal may contain a particulate metal oxide material.

The particulate metal oxide material can further improve the characteristics of the seal, such as the retentivity of the battery shape, insulating properties, thermal conductivity, and moisture barrier properties.

The seal may include a first seal containing a first material and a second seal containing a second material different from the first material, the first seal is located closer to the electrode current collector than the second seal is, and the second seal is located closer to the counter electrode current collector than the first seal is.

In such a case, each material on the positive electrode side and on the negative electrode side can be optimized in terms of reactivity or mechanical characteristics. This can further improve the reliability of the battery.

The at least one recess may be a linear or loop groove.

The groove can improve the mechanical strength of the electrode current collector.

A cell stack according to one aspect of the present disclosure includes a first battery and a second battery disposed on the first battery, and each of the first battery and the second battery is the battery described above.

The number and connection of batteries to be stacked can be controlled to achieve the desired battery characteristics. For example, many batteries can be connected in series to generate a high voltage.

The at least one recess may be filled with a binder.

The binder can improve the adhesive strength between batteries without decreasing the volumetric capacity density of the cell stack.

Embodiments of the present disclosure will be described below with reference to the accompanying drawings.

The following embodiments are general or specific embodiments. The numerical values, shapes, materials, components, arrangement and connection of the components, steps, and sequential order of steps in the following embodiments are only examples and are not intended to limit the present disclosure. Among the components in the following embodiments, components not described in the independent claims are described as optional components.

The accompanying figures are schematic figures and are not necessarily precise figures. Thus, for example, the scale of each figure is not necessarily the same. Like parts are denoted by like reference numerals throughout the figures. Parts once described are not described again or are simply described thereafter.

In the present specification, the terms describing the relationship between elements, such as parallel, the terms describing the shape of an element, such as rectangular, and the numerical ranges not only refer to their exact meanings but also to substantially the same meanings. For example, the numerical ranges tolerate variations of several percent.

The terms "above" and "below", as used herein, do not necessarily indicate upward (vertically upward) and downward (vertically downward) in the sense of absolute spatial perception but indicate the relative positional relationship based on the stacking sequence in multilayer structures. The terms "above" and "below" are applied to not only two components with another component interposed therebetween but also two components in contact with each other.

In the present specification and drawings, the x-axis, y-axis, and z-axis refer to three axes in the three-dimensional rectangular coordinate system. In each embodiment, the z-axis direction is the thickness direction of the battery. The term "thickness direction", as used herein, refers to the direction perpendicular to a surface of an electrode current collector on which an electrode layer is formed or a surface of a counter electrode current collector on which a counter electrode layer is formed. The term "plan view", as used herein, means that a battery is viewed in the thickness direction of the battery.

First Embodiment

Structure

FIG. 1 is a schematic view of a battery 1000 according to a first embodiment. More specifically, FIG. 1(a) is a schematic cross-sectional view of the battery 1000 and is a cross section taken along the dash-dotted line of FIG. 1(b). FIG. 1(b) is a schematic top perspective view of the battery 1000.

In FIG. 1(b), the planar shapes of the components of the battery 1000 viewed from above are indicated by solid lines or broken lines. For the sake of clarity, the region in which a unit cell or an electric-power generating element 100 is located and the region in which a seal 310 is located are shaded.

As illustrated in FIG. 1, the battery 1000 according to the first embodiment includes the electric-power generating element 100, an electrode current collector 210, a counter electrode current collector 220, and the seal 310.

The electric-power generating element 100 is an electricity generation portion having a charging and discharging function, for example. The electric-power generating element 100 is a secondary battery, for example. The electric-power generating element 100 corresponds to a unit cell. The electric-power generating element 100 is disposed between the electrode current collector 210 and the counter electrode current collector 220.

As illustrated in FIG. 1(a), the electric-power generating element 100 includes an electrode layer 110 and a counter electrode layer 120. The electric-power generating element 100 also includes an electrolyte layer 130. The electrode layer 110, the electrolyte layer 130, and the counter electrode layer 120 are stacked in this order in the z-axis direction, which is the thickness direction of the battery 1000.

In the electric-power generating element 100 according to the first embodiment, the electrode layer 110 is a negative electrode of the battery, and the counter electrode layer 120 is a positive electrode of the battery. The electrode current collector 210 is a negative-electrode current collector. The counter electrode current collector 220 is a positive-electrode current collector.

The electrode layer 110 contains electrode materials, such as an active material. More specifically, the electrode layer 110 is a negative-electrode active material layer containing a negative-electrode active material as an electrode material, for example. The electrode layer 110 faces the counter electrode layer 120.

The negative-electrode active material in the electrode layer 110 may be graphite or metallic lithium. The negative-electrode active material can intercalate and deintercalate lithium (Li) or magnesium (Mg) ions.

The electrode layer 110 may contain a solid electrolyte, such as an inorganic solid electrolyte. The inorganic solid electrolyte may be a sulfide solid electrolyte or an oxide solid electrolyte. The sulfide solid electrolyte may be a mixture of lithium sulfide ($Li_2S$) and diphosphorus pentasulfide ($P_2S_5$). The electrode layer 110 may contain an electrically conductive material, such as acetylene black, or a binder, such as poly(vinylidene difluoride).

The electrode layer 110 can be formed by applying a paste containing the materials in a solvent to the electrode current collector 210 and drying the paste. After drying, the electrode sheet (a negative electrode sheet in the present embodiment) including the electrode layer 110 and the electrode current collector 210 may be pressed to increase the density of the electrode layer 110. The electrode layer 110 has a thickness in the range of 5 to 300 μm, for example.

The counter electrode layer 120 contains counter electrode materials, such as an active material. The counter electrode materials constitute the counter electrode. More specifically, the counter electrode layer 120 is a positive-electrode active material layer containing a positive-electrode active material as a counter electrode material, for example.

The positive-electrode active material in the counter electrode layer 120 may be lithium cobalt oxide ($LiCoO_2$) or lithium nickel oxide ($LiNiO_2$). The positive-electrode active material can intercalate and deintercalate Li or Mg ions. The positive-electrode active material in the counter electrode layer 120 may be lithium cobalt oxide composite oxide (LCO), lithium nickel oxide composite oxide (LNO), lithium manganese oxide composite oxide (LMO), lithium-manganese-nickel composite oxide (LMNO), lithium-manganese-cobalt composite oxide (LMCO), lithium-nickel-cobalt composite oxide (LNCO), or lithium-nickel-manganese-cobalt composite oxide (LNMCO).

The counter electrode layer 120 may contain a solid electrolyte, such as an inorganic solid electrolyte. The inorganic solid electrolyte may be a sulfide solid electrolyte or an oxide solid electrolyte. The sulfide solid electrolyte may be a mixture of $Li_2S$ and $P_2S_5$. The positive-electrode active material may be coated with a solid electrolyte. The counter electrode layer 120 may contain an electrically conductive material, such as acetylene black, or a binder, such as poly(vinylidene difluoride).

The counter electrode layer 120 can be formed by applying a paste containing the materials in a solvent to the counter electrode current collector 220 and drying the paste.

After drying, the counter electrode sheet (a positive electrode sheet in the present embodiment) including the counter electrode layer 120 and the counter electrode current collector 220 may be pressed to increase the density of the counter electrode layer 120. The counter electrode layer 120 has a thickness in the range of 5 to 300 μm, for example.

The electrolyte layer 130 is disposed between the electrode layer 110 and the counter electrode layer 120. The electrolyte layer 130 is in contact with the electrode layer 110 and the counter electrode layer 120. The electrolyte layer 130 contains an electrolyte material. The electrolyte material may be a known battery electrolyte. The electrolyte layer 130 may have a thickness in the range of 5 to 300 μm or 5 to 100 μm.

The electrolyte layer 130 has the same size and planar shape as the electrode layer 110 and the counter electrode layer 120. In other words, the electrolyte layer 130 has an end (that is, a side surface) flush with an end (that is, a side surface) of the electrode layer 110 and an end (that is, a side surface) of the counter electrode layer 120.

The electrolyte material may be a solid electrolyte. More specifically, the electrolyte layer 130 in the electric-power generating element 100 may be a solid electrolyte layer. The electric-power generating element 100 may be a solid cell.

The solid electrolyte may be an inorganic solid electrolyte. The inorganic solid electrolyte may be a sulfide solid electrolyte or an oxide solid electrolyte. The sulfide solid electrolyte may be a mixture of $Li_2S$ and $P_2S_5$. The electrolyte layer 130 may contain a binder, such as poly(vinylidene difluoride), in addition to the electrolyte material.

In the first embodiment, the electrode layer 110, the counter electrode layer 120, and the electrolyte layer 130 are flat layers parallel to each other. This can prevent cracking or collapsing due to bending. The electrode layer 110, the counter electrode layer 120, and the electrolyte layer 130 may be smoothly bent together.

In the electric-power generating element 100, the electrode layer 110 may be a positive electrode of the battery, and the counter electrode layer 120 may be a negative electrode of the battery. More specifically, the electrode layer 110 may be a positive-electrode active material layer containing a positive-electrode active material as an electrode material. In this case, the electrode current collector 210 is a positive-electrode current collector. The counter electrode layer 120 is a negative-electrode active material layer containing a negative-electrode active material as a counter electrode material. The counter electrode current collector 220 is a negative-electrode current collector.

In the first embodiment, the electrode layer 110 and the counter electrode layer 120 have the same size and shape. In the plan view, the electric-power generating element 100 is smaller than the electrode current collector 210 and the counter electrode current collector 220 and is located inside the electrode current collector 210 and the counter electrode current collector 220.

The electrode current collector 210 and the counter electrode current collector 220 are electrically conductive. The electrode current collector 210 and the counter electrode current collector 220 may be electrically conductive thin films. A material constituting the electrode current collector 210 and the counter electrode current collector 220 may be a metal, such as stainless steel (SUS), aluminum (Al), or copper (Cu).

The electrode current collector 210 is in contact with the electrode layer 110. As described above, the electrode current collector 210 is a negative-electrode current collector. The negative-electrode current collector may be metal foil, such as SUS foil or Cu foil. The electrode current collector 210 may have a thickness in the range of 5 to 100 μm. The electrode current collector 210 may have a current collector layer containing an electrically conductive material in contact with the electrode layer 110.

In the plan view, the electrode current collector 210 is larger than the electrode layer 110. In FIG. 1(b), a first region 230 is at least part of the periphery of the electrode current collector 210 and has no electrode layer 110. In the first embodiment, in the plan view, the electrode layer 110 is located in the center of the electrode current collector 210, and the first region 230 is disposed on the entire perimeter of the electrode current collector 210. More specifically, the planar shape of the first region 230 is a rectangular loop with a predetermined width.

The counter electrode current collector 220 is in contact with the counter electrode layer 120. As described above, the counter electrode current collector 220 is a positive-electrode current collector. The positive-electrode current collector may be metal foil, such as SUS foil or Al foil. The counter electrode current collector 220 may have a thickness in the range of 5 to 100 μm. The counter electrode current collector 220 may have a current collector layer in contact with the counter electrode layer 120.

In the plan view, the counter electrode current collector 220 is larger than the counter electrode layer 120. In FIG. 1(b), a second region 240 is at least part of the periphery of the counter electrode current collector 220 and has no counter electrode layer 120. In the first embodiment, in the plan view, the counter electrode layer 120 is located in the center of the counter electrode current collector 220, and the second region 240 is disposed on the entire perimeter of the counter electrode current collector 220. More specifically, the planar shape of the second region 240 is a rectangular loop with a predetermined width. In the first embodiment, the second region 240 in the rectangular loop shape is narrower than the first region 230 in the rectangular loop shape.

In a facing region 250 in FIG. 1(b), the electrode current collector 210 faces the counter electrode current collector 220. In other words, the electrode current collector 210 overlaps the counter electrode current collector 220 in the facing region 250 in the plan view. In the first embodiment, the counter electrode current collector 220 is smaller than the electrode current collector 210, and the counter electrode current collector 220 is located inside the electrode current collector 210 in the plan view. In this case, the facing region 250 has the same planar shape as the counter electrode current collector 220. In the first embodiment, the facing region 250 is composed of the region in which the electric-power generating element 100 is disposed and the second region 240.

In the first embodiment, the electrode current collector 210 faces the counter electrode current collector 220 such that they are flat and parallel to each other at least in the region in which the electric-power generating element 100 is disposed. More specifically, the counter electrode current collector 220 is a flat sheet with a uniform thickness. The electrode current collector 210 is a sheet with a uniform thickness and with a recess 210a.

The recess 210a is formed by protruding a portion of the electrode current collector 210 toward the counter electrode current collector 220. In other words, the recess 210a is a portion of the electrode current collector 210 reinforced by bending. The electrode current collector 210 with such a bent structure has a higher mechanical strength than simple flat sheets. This improves the reliability of the battery 1000.

The recess 210a is formed in part of the region of the electrode current collector 210 facing (more specifically, in contact with) the seal 310. In other words, the electrode current collector 210 has the recess 210a in the region of the electrode current collector 210 in which the seal 310 is disposed.

This structure can increase the contact area between the electrode current collector 210 and the seal 310 and improve the adhesive strength between the seal 310 and the electrode current collector 210. Thus, the seal 310 is rarely broken by an external force, thus reducing the occurrence of delamination of the electric-power generating element 100.

The recess 210a has a linear shape in the longitudinal direction of the seal 310 in the plan view (the y-axis direction in the figure), for example. Thus, the recess 210a is a groove with a linear planar shape. This structure can enhance the bending effects of the electrode current collector 210 and certainly improve the strength of the battery 1000.

The electrode current collector 210 may have a plurality of relatively small recesses 210a in the longitudinal direction of the seal 310 in the plan view. Such a structure can further increase the contact area between the electrode current collector 210 and the seal 310 and improve the adhesive strength between the seal 310 and the electrode current collector 210 as compared with the structure in which the recess 210a is one linear groove.

When the recess 210a is formed in a portion of the electrode current collector 210 facing the seal 310, the distance between the electrode current collector 210 and the counter electrode current collector 220 in the thickness direction can be constant in the power generation region in which the electric-power generating element 100 is located between the electrode current collector 210 and the counter electrode current collector 220. This can ensure the volume of the electric-power generating element 100. This can also prevent cracking or collapsing due to bending of this portion.

The recess 210a formed in the portion of the electrode current collector 210 facing the seal 310 can ensure the volume of the electric-power generating element 100, improve the mechanical strength of the electrode current collector 210, and improve the reliability of the battery 1000.

The recess 210a may have a depth 1 to 100 times the thickness of the electrode current collector 210, for example. Limiting the depth of the recess 210a to such a range can prevent the breakage of the electrode current collector 210.

The recess 210a has a V- or approximately V-shaped cross-section, for example. When the recess 210a has a region inclined at an angle of 15 degrees or more with respect to a main surface (the xy plane) of the electrode current collector 210, the recess 210a can enhance the bending effects of the electrode current collector 210 and certainly improve the strength of the battery 1000. The recess 210a may have another cross-sectional shape, such as a U shape (or an approximately U shape).

The recess 210a is located inside an end of the electrode current collector 210 (the outermost end in the plan view). This structure enables a plurality of recesses 210a to be easily formed, and the plurality of recesses 210a can certainly further improve the strength of the battery 1000.

The seal 310 is disposed between the electrode current collector 210 and the counter electrode current collector 220. The seal 310 is formed of an electrically insulating material, for example. The seal 310 functions as a spacer to keep the distance between the electrode current collector 210 and the counter electrode current collector 220. The seal 310 seals the electric-power generating element 100 between the electrode current collector 210 and the counter electrode current collector 220. The seal 310 seals at least part of the electric-power generating element 100 to avoid contact with the outside air.

In the first embodiment, as illustrated in FIG. 1(a), the seal 310 is in contact with the electrode current collector 210 and the counter electrode current collector 220. More specifically, the seal 310 is in contact with the electrode current collector 210 in the first region 230, in which the electrode layer 110 is not disposed, on a surface on which the electrode layer 110 is disposed. The seal 310 is in contact with the counter electrode current collector 220 in the second region 240, in which the counter electrode layer 120 is not disposed, on a surface on which the counter electrode layer 120 is disposed. Thus, in the plan view, the seal 310 is disposed in the position in which the first region 230 faces the second region 240. In the first embodiment, the seal 310 has a uniform thickness.

In this structure, the seal 310 can more strongly keep at least a certain distance between the electrode current collector 210 and the counter electrode current collector 220 (for example, a distance greater than or equal to the thickness of the seal 310) around the electric-power generating element 100. Thus, the seal 310 can more strongly prevent the electrode current collector 210 and the counter electrode current collector 220 from approaching each other. This can reduce the risk of a short circuit between the electrode layer 110 and the counter electrode layer 120 due to direct contact between the electrode current collector 210 and the counter electrode current collector 220.

Furthermore, when the battery 1000 has a volume change during use or even when the battery 1000 is subjected to an impact from the outside, the seal 310 can shift the stress caused by these phenomena to the internal space and thereby relieve the stress. Thus, the seal 310 can reduce the risk of breakage, such as delamination or cracking, in the battery 1000 (in particular, a solid cell with no separator between the electrode layer 110 and the counter electrode layer 120).

In the first embodiment, as illustrated in FIG. 1(a), the seal 310 is in contact with the electric-power generating element 100. More specifically, the seal 310 is in contact with at least one side surface of the electrode layer 110, the counter electrode layer 120, and the electrolyte layer 130. For example, the seal 310 is in contact with each side surface of the electrode layer 110, the counter electrode layer 120, and the electrolyte layer 130.

For example, as illustrated in FIG. 1(b), when the electric-power generating element 100 has a rectangular planar shape, the seal 310 may be located in contact with one side of the rectangular planar shape of the electric-power generating element 100. In the first embodiment, although the seal 310 has a trapezoidal planar shape in FIG. 1(b), the seal 310 may have another shape.

In such a structure, the seal 310 can protect a side surface of the electric-power generating element 100. More specifically, the seal 310 can prevent a material constituting the electric-power generating element 100 (for example, an electrode material in the electrode layer 110, a counter electrode material in the counter electrode layer 120, or a solid electrolyte material in the electrolyte layer 130) from partly collapsing.

For example, the seal 310 contains a first material. The seal 310 may contain the first material as a main component. The seal 310 may be composed of only the first material. The first material may be a known seal material, such as a sealant, for use in batteries. The first material may be a resin material.

When the battery 1000 is subjected to an external force or is exposed to a wet atmosphere or an ambient gas component, due to its flexibility, pliability, or gas barrier properties, the seal 310 containing a resin or sealant can further prevent or reduce adverse effects on the electric-power generating element 100. This can further improve the reliability of the battery 1000.

The first material may be an insulating material having no ion conductivity. The insulating first material can prevent electrical conduction between the electrode current collector 210 and the counter electrode current collector 220. The first material having no ion conductivity can reduce the degradation of battery characteristics due to contact between the seal 310 and another battery component, for example, the seal 310 of another battery.

The first material may be at least one selected from the group consisting of epoxy resins, acrylic resins, polyimide resins, and silsesquioxanes. The first material may initially have flowability and can be cured afterward (for example, by eliminating flowability by ultraviolet radiation or heat treatment). Thus, the insulating seal 310 having no ion conductivity can be easily formed.

The seal 310 may contain a particulate metal oxide material. The particulate metal oxide material can further improve the characteristics of the seal 310 (such as the retentivity of the battery shape, insulating properties, thermal conductivity, and moisture barrier properties). The metal oxide material may be silicon oxide, aluminum oxide, titanium oxide, zinc oxide, cerium oxide, iron oxide, tungsten oxide, zirconium oxide, calcium oxide, zeolite, or glass. For example, the seal 310 may be formed of a resin material containing metal oxide material particles dispersed therein.

The metal oxide material particles have a size smaller than or equal to the distance between the electrode current collector 210 and the counter electrode current collector 220. The metal oxide material particles may have the shape of a perfect circle (sphere), ellipsoid, or rod.

Modified Examples

Modified examples of the first embodiment will be described below. The following description of the modified examples focuses on the points of difference from the first embodiment or the points of difference between the modified examples, and points once described are not described again or are simply described thereafter.

Modified Example 1

Figure 2:
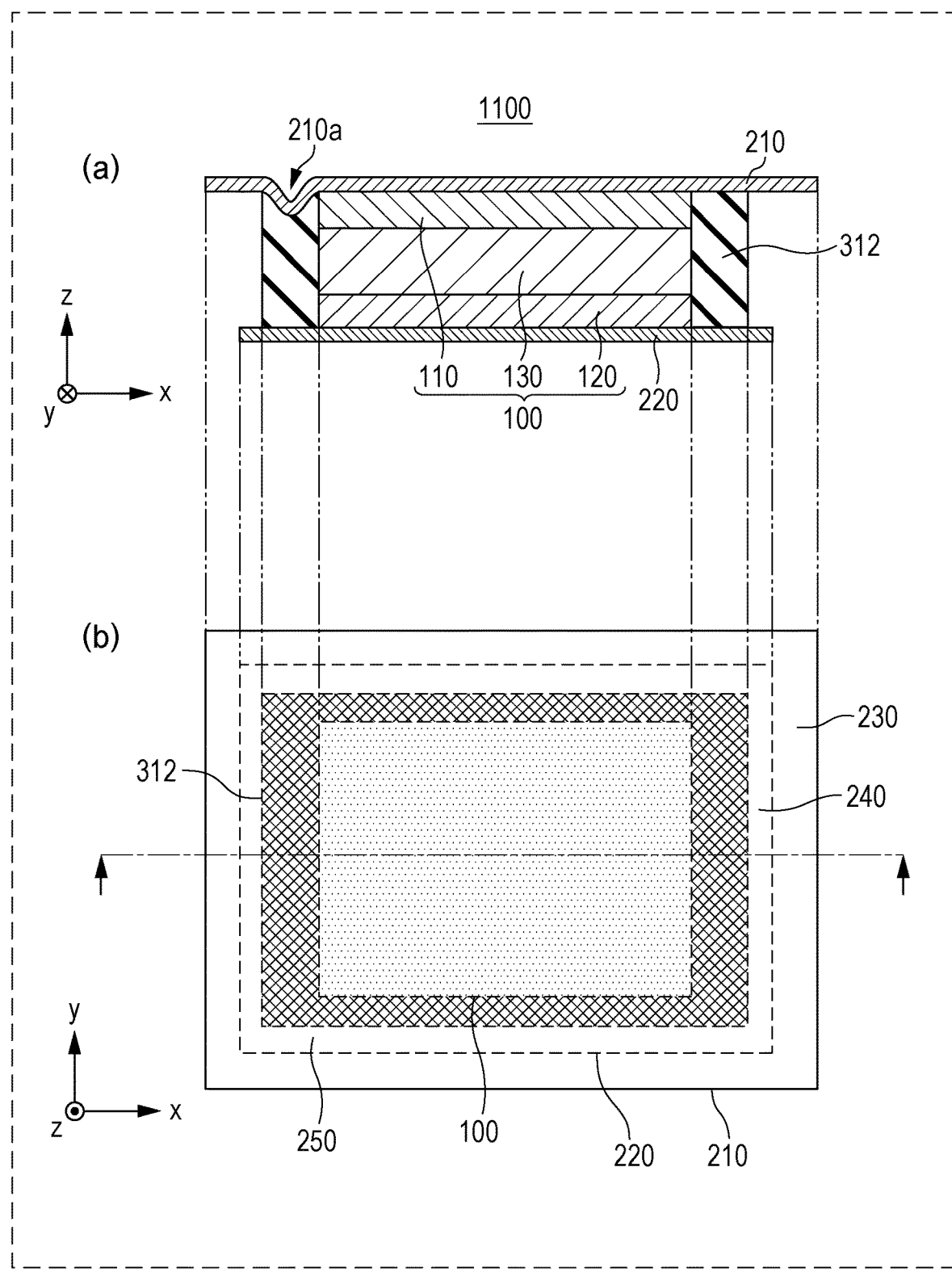
FIG. 2 is a schematic view of a battery according to Modified Example 1 of the first embodiment.

First, Modified Example 1 of the first embodiment is described below with reference to FIG. 2. FIG. 2 is a schematic view of a battery 1100 according to Modified Example 1 of the first embodiment. More specifically, FIG. 2(*a*) is a schematic cross-sectional view of the battery 1100 and is a cross section taken along the dash-dotted line of FIG. 2(*b*). FIG. 2(*b*) is a schematic top perspective view of the battery 1100.

In FIG. 2(*b*), the planar shapes of the components of the battery 1100 viewed from above are indicated by solid lines or broken lines. For the sake of clarity, the region in which the electric-power generating element 100 is located and the region in which a seal 312 is located are shaded.

As illustrated in FIG. 2, the battery 1100 includes the seal 312 instead of the seal 310 in the battery 1000 according to the first embodiment.

The seal 312 surrounds the electric-power generating element 100. More specifically, in the plan view, the seal 312 is continuously formed all around the electric-power generating element 100. The seal 312 seals all side surfaces of the electric-power generating element 100. For example, if the electric-power generating element 100 has a rectangular planar shape, the seal 312 may be in contact with all sides of the electric-power generating element 100. In a lateral view of the battery 1100 (more specifically, in a direction perpendicular to the z-axis), the electric-power generating element 100 is completely covered with the seal 312 and is not exposed to the outside.

As illustrated in FIG. 2(*b*), the seal 312 has a planar shape of a rectangular loop with a predetermined width. In the plan view, the seal 312 is narrower than the second region 240 in the rectangular loop shape. In the present modified example, the seal 312 has a uniform thickness. More specifically, the seal 312 has the same thickness as the electric-power generating element 100 along the entire perimeter of the seal 312.

In this structure, the seal 312 can keep at least a certain distance between the electrode current collector 210 and the counter electrode current collector 220 (for example, a distance greater than or equal to the thickness of the seal 312) all around the electric-power generating element 100. Thus, the seal 312 can prevent the electrode current collector 210 and the counter electrode current collector 220 from approaching each other all around the electric-power generating element 100.

Furthermore, in this structure, the side surfaces of the electric-power generating element 100 can be covered with the seal 312. Thus, for example, even when an electrode material in the electrode layer 110, a counter electrode material in the counter electrode layer 120, or a solid electrolyte material in the electrolyte layer 130 collapses partly, the seal 312 can prevent the collapsed portion from coming into contact with another component in the battery. This can prevent a short circuit in the battery resulting from collapsing of a component of the battery 1100. Thus, the reliability of the battery 1100 can be further improved.

Furthermore, even when one of the electrode current collector 210 and the counter electrode current collector 220 is deformed (for example, bending or burring) around the electric-power generating element 100, the seal 312 can prevent the deformed portion from coming into contact with the other of the electrode current collector 210 and the counter electrode current collector 220. This can further reduce the risk of a short circuit between the electrode layer 110 and the counter electrode layer 120.

Modified Example 2

Figure 3:
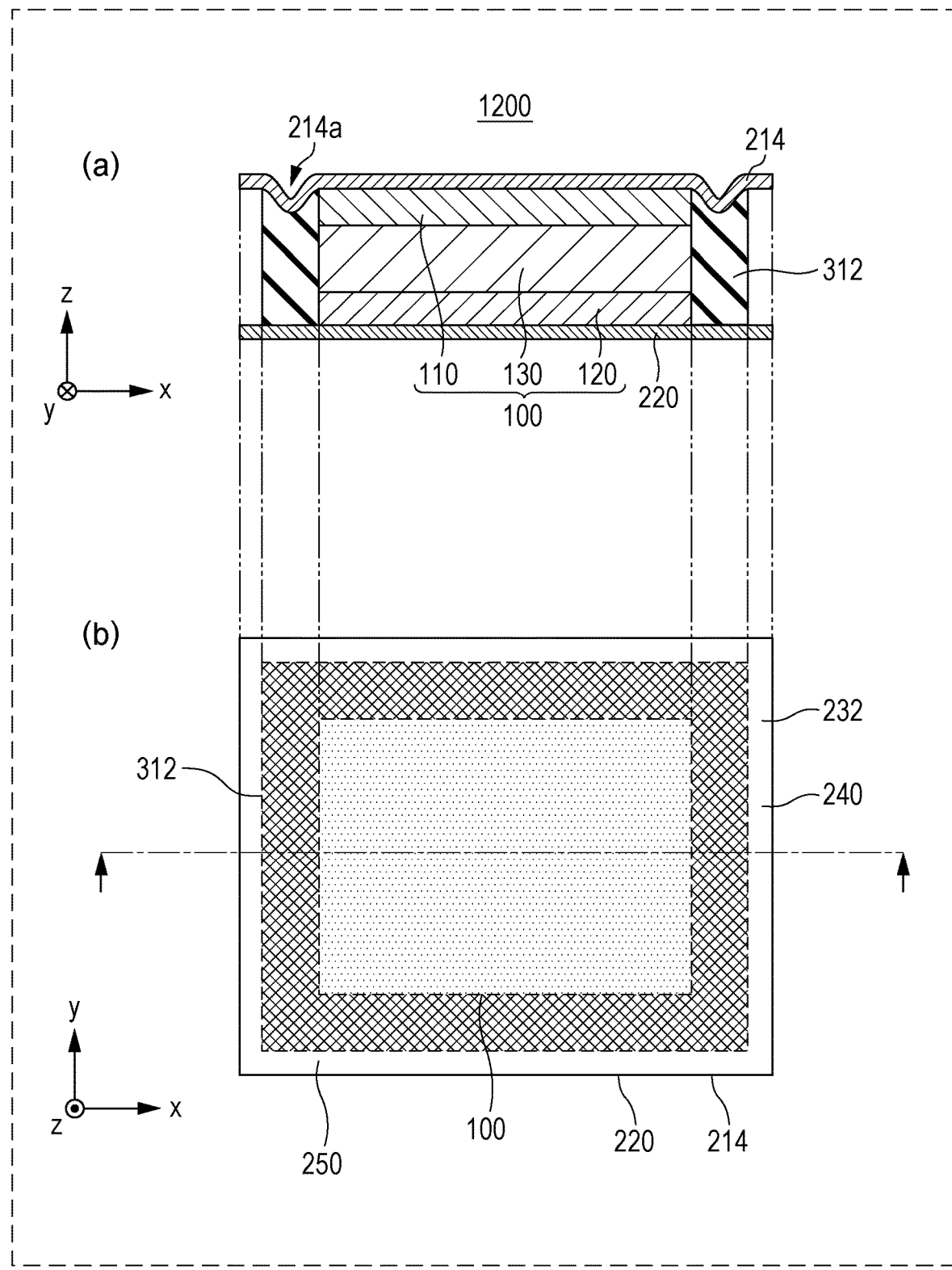
FIG. 3 is a schematic view of a battery according to Modified Example 2 of the first embodiment.

Next, Modified Example 2 of the first embodiment is described below with reference to FIG. 3. FIG. 3 is a schematic view of a battery 1200 according to Modified Example 2 of the first embodiment. More specifically, FIG. 3(*a*) is a schematic cross-sectional view of the battery 1200 and is a cross section taken along the dash-dotted line of FIG. 3(*b*). FIG. 3(*b*) is a schematic top perspective view of the battery 1200.

In FIG. 3(*b*), the planar shapes of the components of the battery 1200 viewed from above are indicated by solid lines or broken lines. For the sake of clarity, the region in which the electric-power generating element 100 is located and the region in which the seal 312 is located are shaded.

As illustrated in FIG. 3, the battery 1200 includes an electrode current collector 214 instead of the electrode current collector 210 in the battery 1100 according to Modified Example 1. The electrode current collector 214 has the same planar shape and size as the counter electrode current collector 220.

Thus, as illustrated in FIG. 3(b), the electrode current collector 214 and the counter electrode current collector 220 have the same size and shape, and a first region 232 in which the electrode layer 110 is not disposed has the same size and shape as the second region 240 in which the counter electrode layer 120 is not disposed. The facing region 250 is the same as each formation region of the electrode current collector 214 and the counter electrode current collector 220.

In this structure, the electrode current collector 214 does not extend outside the counter electrode current collector 220, and therefore an impact from the outside is rarely applied to separate the electrode current collector 214 from the counter electrode current collector 220. This can prevent the electrode current collector 214 from being detached and prevent the battery 1200 from being destroyed.

A recess 214a in the electrode current collector 214 is a rectangular loop along the seal 312 in the plan view. Thus, the recess 214a is a groove with a planar shape of a rectangular loop. The recess 214a has a V- or approximately V-shaped cross-section, for example, and may have another shape, such as a U shape (or an approximately U shape).

This structure can increase the contact area between the electrode current collector 214 and the seal 312 and improve the adhesive strength between the seal 312 and the electrode current collector 214. Thus, the seal 312 is rarely broken by an external force, thus reducing the occurrence of delamination of the electric-power generating element 100.

The electrode current collector 214 may have a plurality of relatively small recesses 214a each in the shape of a rectangular loop along the seal 312 in the plan view. Such a structure can further increase the contact area between the electrode current collector 214 and the seal 312 and improve the adhesive strength between the seal 312 and the electrode current collector 214 as compared with the structure in which the recess 214a is one groove in the shape of a rectangular loop.

Modified Example 3

Figure 4:
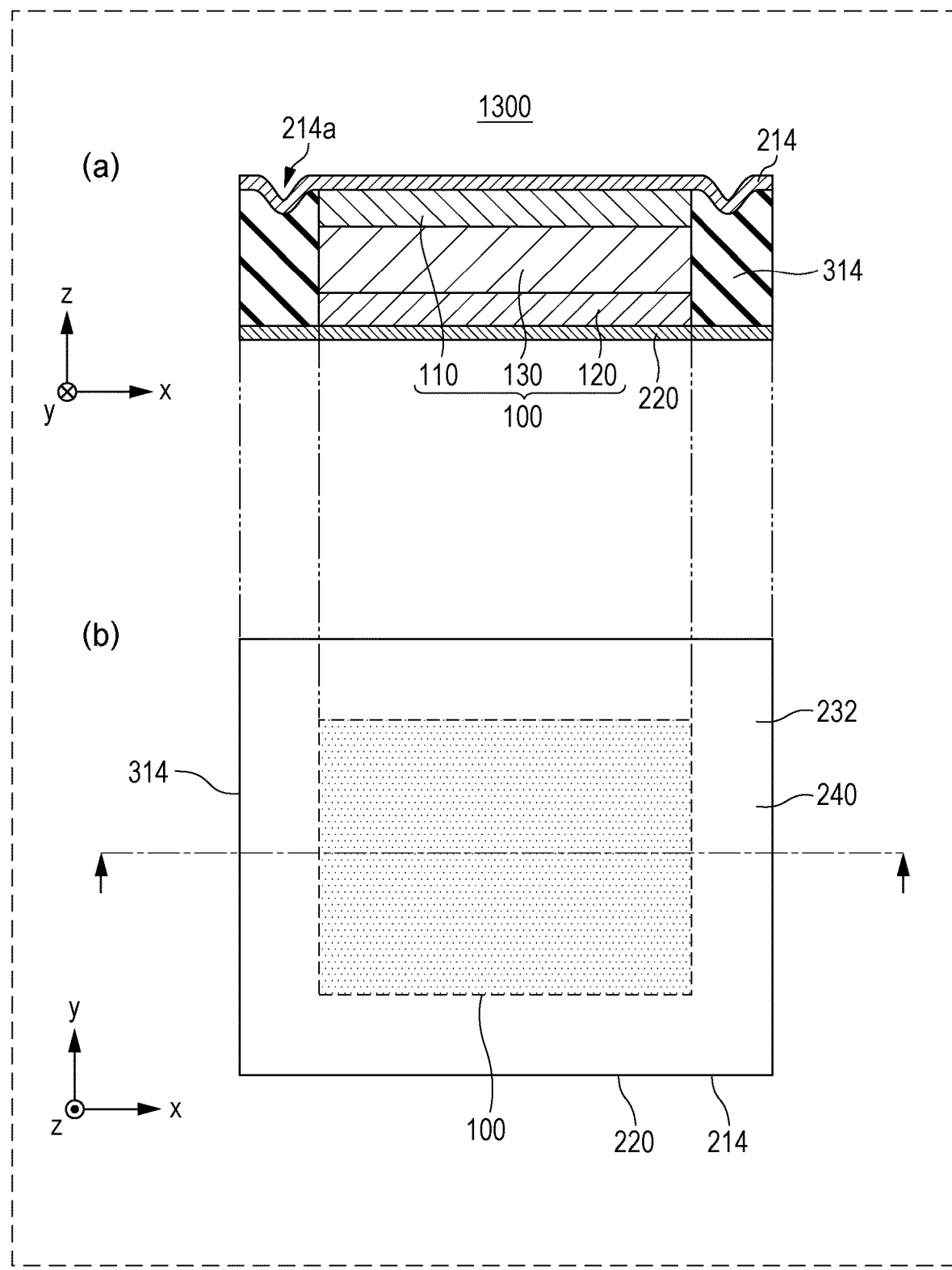
FIG. 4 is a schematic view of a battery according to Modified Example 3 of the first embodiment.

Next, Modified Example 3 of the first embodiment is described below with reference to FIG. 4. FIG. 4 is a schematic view of a battery 1300 according to Modified Example 3 of the first embodiment. More specifically, FIG. 4(a) is a schematic cross-sectional view of the battery 1300 and is a cross section taken along the dash-dotted line of FIG. 4(b). FIG. 4(b) is a schematic top perspective view of the battery 1300.

In FIG. 4(b), the planar shapes of the components of the battery 1300 viewed from above are indicated by solid lines or broken lines. For the sake of clarity, the region in which the electric-power generating element 100 is located is shaded.

As illustrated in FIG. 4, the battery 1300 includes a seal 314 instead of the seal 312 in the battery 1200 according to Modified Example 2.

The seal 314 fills the space between the electrode current collector 214 and the counter electrode current collector 220. As illustrated in FIG. 4(b), the external planar shape of the seal 314 is the same as each planar shape of the first region 232 and the second region 240. In other words, the seal 314 is disposed in the entire first region 232 and the entire second region 240. As illustrated in FIG. 4(a), an outer side surface of the seal 314 (for example, a side surface parallel to the yz plane) is flush with an end surface of the electrode current collector 214 parallel to the yz plane and with an end surface of the counter electrode current collector 220 parallel to the yz plane.

In the present modified example, the seal 314 has a uniform thickness. More specifically, the thickness of the seal 314 is equal to the thickness of the electric-power generating element 100 along the entire perimeter of the seal 314.

In this structure, the space between the periphery of the electrode current collector 214 and the periphery of the counter electrode current collector 220 is filled with the seal 314, and therefore an impact from the outside is rarely applied to separate one of the electrode current collector 214 and the counter electrode current collector 220 from the other. This can prevent the electrode current collector 214 and the counter electrode current collector 220 from being detached and prevent the battery 1300 from being destroyed.

Modified Example 4

Figure 5:
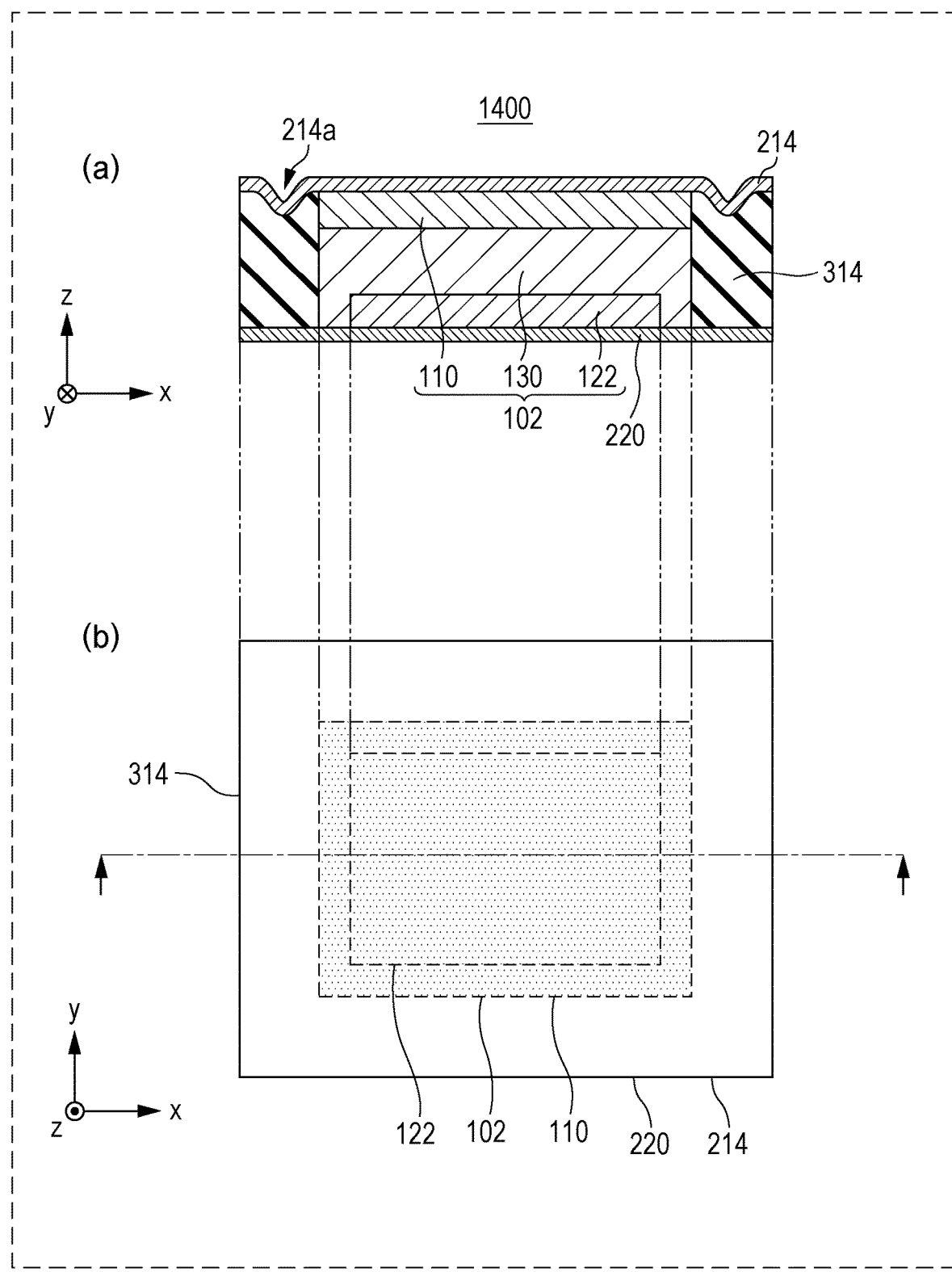
FIG. 5 is a schematic view of a battery according to Modified Example 4 of the first embodiment.

Next, Modified Example 4 of the first embodiment is described below with reference to FIG. 5. FIG. 5 is a schematic view of a battery 1400 according to Modified Example 4 of the first embodiment. More specifically, FIG. 5(a) is a schematic cross-sectional view of the battery 1400 and is a cross section taken along the dash-dotted line of FIG. 5(b). FIG. 5(b) is a schematic top perspective view of the battery 1400.

In FIG. 5(b), the planar shapes of the components of the battery 1400 viewed from above are indicated by solid lines or broken lines. For the sake of clarity, the region in which an electric-power generating element 102 is located is shaded.

As illustrated in FIG. 5, the battery 1400 includes the electric-power generating element 102 instead of the electric-power generating element 100 in the battery 1300 according to Modified Example 3. The electric-power generating element 102 includes a counter electrode layer 122 and an electrolyte layer 132 instead of the counter electrode layer 120 and the electrolyte layer 130.

In Modified Example 4, the electrode layer 110 and the counter electrode layer 122 have different sizes. For example, in the plan view, the electrode layer 110 is larger than the counter electrode layer 122. As illustrated in FIG. 5(b), the counter electrode layer 122 is located inside the electrode layer 110 in the plan view.

As illustrated in FIG. 5(a), the electrolyte layer 132 covers side surfaces of the counter electrode layer 122. The electrolyte layer 132 is in contact with the counter electrode current collector 220. The seal 314 is in contact with side surfaces of the electrode layer 110 and side surfaces of the electrolyte layer 132 and is not in contact with the counter electrode layer 122.

Although the counter electrode layer 122 is smaller than the electrode layer 110 in the present modified example, the electrode layer 110 may be smaller than the counter electrode layer 122. In such a case, the electrolyte layer 132 may cover side surfaces of the electrode layer 110. The seal 314 may be in contact with side surfaces of the counter electrode layer 122 and side surfaces of the electrolyte layer 132 and may be separated from the electrode layer 110.

For example, one of the counter electrode layer 122 and the electrode layer 110 corresponding to a positive electrode may be smaller than the other of the counter electrode layer 122 and the electrode layer 110 corresponding to a negative electrode. In other words, a negative-electrode active material layer is larger than a positive-electrode active material layer. This can reduce the decrease in the reliability of the battery due to lithium deposition or magnesium deposition.

Modified Example 5

Figure 6:
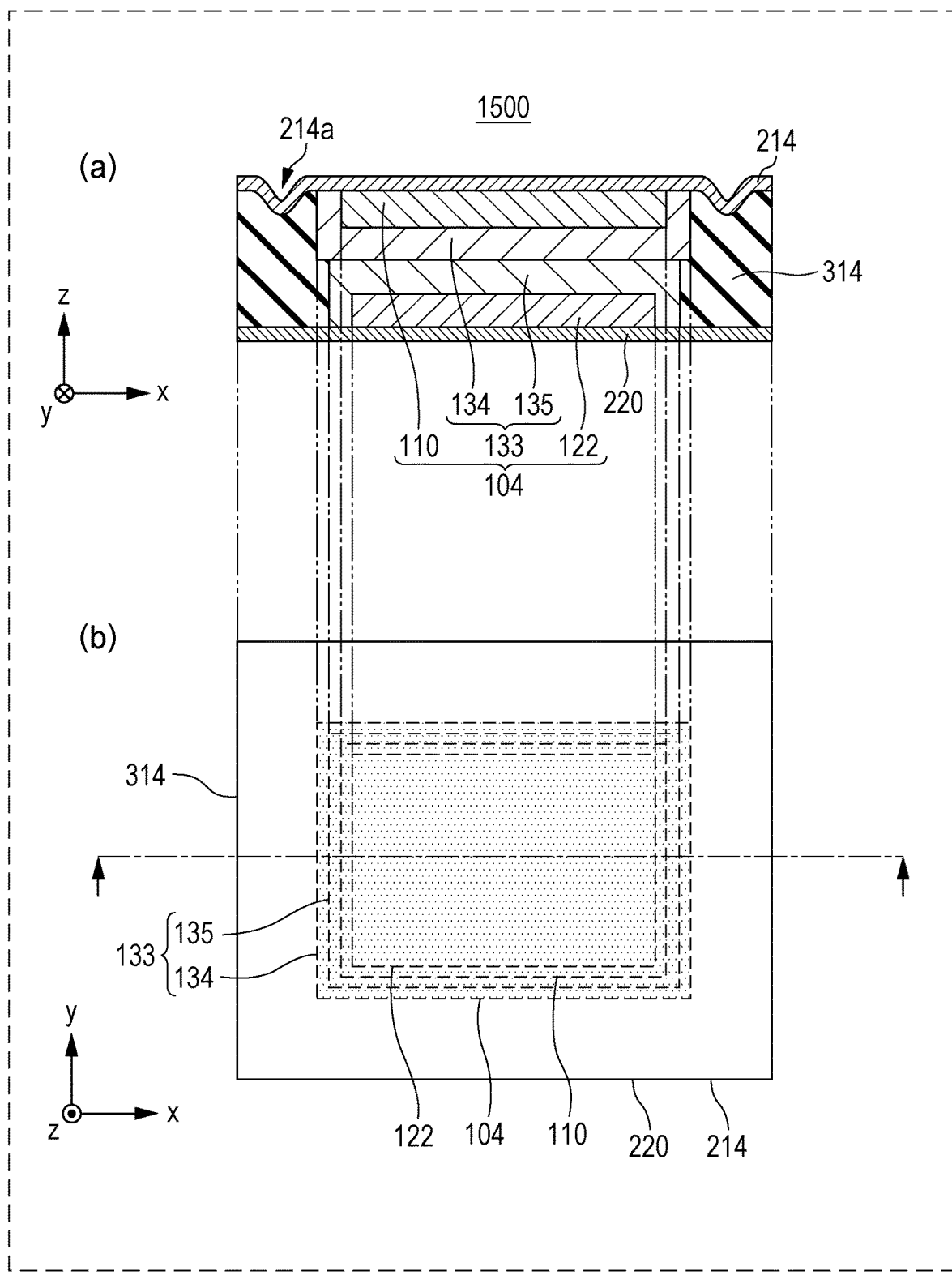
FIG. 6 is a schematic view of a battery according to Modified Example 5 of the first embodiment.

Next, Modified Example 5 of the first embodiment is described below with reference to FIG. 6. FIG. 6 is a schematic view of a battery 1500 according to Modified Example 5 of the first embodiment. More specifically, FIG. 6(a) is a schematic cross-sectional view of the battery 1500 and is a cross section taken along the dash-dotted line of FIG. 6(b). FIG. 6(b) is a schematic top perspective view of the battery 1500.

In FIG. 6(b), the planar shapes of the components of the battery 1500 viewed from above are indicated by solid lines or broken lines. For the sake of clarity, the region in which an electric-power generating element 104 is located is shaded.

As illustrated in FIG. 6, the battery 1500 includes the electric-power generating element 104 instead of the electric-power generating element 102 in the battery 1400 according to Modified Example 4. The electric-power generating element 104 includes an electrolyte layer 133 instead of the electrolyte layer 132 in the electric-power generating element 102. The electrolyte layer 133 includes an electrode side electrolyte layer 134 and a counter electrode side electrolyte layer 135.

The electrode side electrolyte layer 134 is located closer to the electrode layer 110 than the counter electrode side electrolyte layer 135 is and is in contact with the electrode layer 110. As illustrated in FIG. 6(a), for example, the electrode side electrolyte layer 134 covers the side surfaces of the electrode layer 110 and is in contact with the electrode current collector 214. The electrode layer 110 covered with the electrode side electrolyte layer 134 is not exposed to the outside. More specifically, the electrode layer 110 is not in contact with the seal 314.

The counter electrode side electrolyte layer 135 is located closer to the counter electrode layer 122 than the electrode side electrolyte layer 134 is and is in contact with the counter electrode layer 122. As illustrated in FIG. 6(a), for example, the counter electrode side electrolyte layer 135 covers the side surfaces of the counter electrode layer 122 and is in contact with the counter electrode current collector 220. The counter electrode layer 122 covered with the counter electrode side electrolyte layer 135 is not exposed to the outside. More specifically, the counter electrode layer 122 is not in contact with the seal 314.

As illustrated in FIG. 6(b), in the plan view, the electrode side electrolyte layer 134 is larger than the counter electrode side electrolyte layer 135. More specifically, in the plan view, the counter electrode side electrolyte layer 135 is located inside the electrode side electrolyte layer 134. The electrode side electrolyte layer 134 and the counter electrode side electrolyte layer 135 may have the same size and shape. For example, the side surfaces of the electrode side electrolyte layer 134 may be flush with the side surfaces of the counter electrode side electrolyte layer 135.

The electrode side electrolyte layer 134 and the counter electrode side electrolyte layer 135 contain an electrolyte material. The electrolyte material may be a known battery electrolyte. The electrolyte material may be a solid electrolyte. The electrode side electrolyte layer 134 and the counter electrode side electrolyte layer 135 may contain the same electrolyte material or different electrolyte materials. The electrode side electrolyte layer 134 and the counter electrode side electrolyte layer 135 may have a thicknesses in the range of 5 to 150 μm or 5 to 50 μm.

The seal 314 is in contact with the side surfaces of the electrode side electrolyte layer 134 and the side surfaces of the counter electrode side electrolyte layer 135. At least part of the side surfaces of the electrode side electrolyte layer 134 and the side surfaces of the counter electrode side electrolyte layer 135 may not be covered with the seal 314 and may be exposed.

In such a structure, the electrolyte layer 133 covers both the electrode layer 110 and the counter electrode layer 122 and therefore can reduce the decrease in battery capacity due to the collapse or isolation of part of the electrode layer 110 or the counter electrode layer 122.

Modified Example 6

Figure 7:
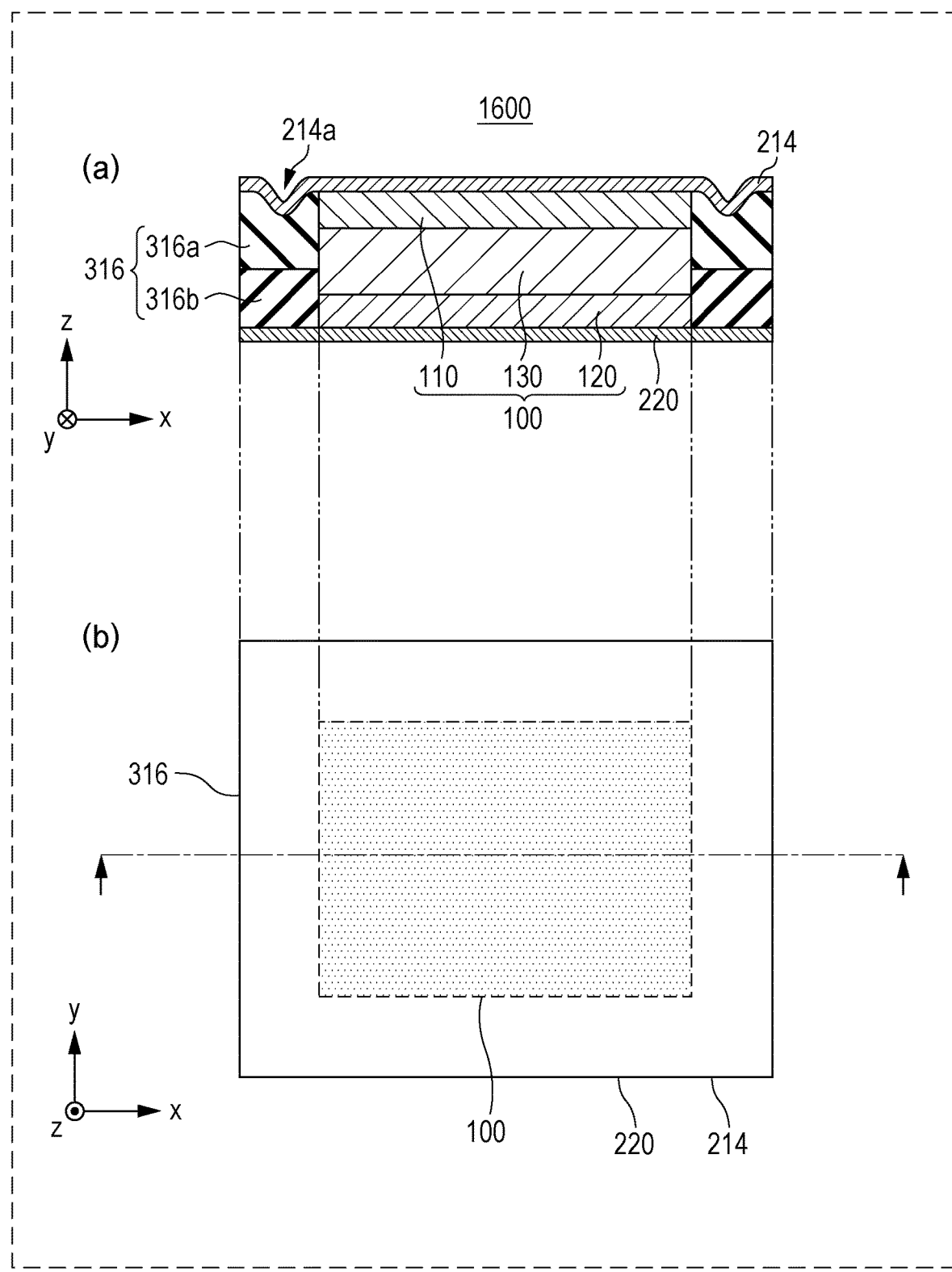
FIG. 7 is a schematic view of a battery according to Modified Example 6 of the first embodiment.

Next, Modified Example 6 of the first embodiment is described below with reference to FIG. 7. FIG. 7 is a schematic view of a battery 1600 according to Modified Example 6 of the first embodiment. More specifically, FIG. 7(a) is a schematic cross-sectional view of the battery 1600 and is a cross section taken along the dash-dotted line of FIG. 7(b). FIG. 7(b) is a schematic top perspective view of the battery 1600.

In FIG. 7(b), the planar shapes of the components of the battery 1600 viewed from above are indicated by solid lines or broken lines. For the sake of clarity, the region in which the electric-power generating element 100 is located is shaded.

As illustrated in FIG. 7, the battery 1600 includes a seal 316 instead of the seal 314 in the battery 1300 according to Modified Example 3.

The seal 316 surrounds the electric-power generating element 100. More specifically, in the plan view, the seal 316 is continuously formed all around the electric-power generating element 100.

The seal 316 has a two-layer structure composed of a first seal 316a located near the electrode current collector 214 and a second seal 316b located near the counter electrode current collector 220. The first seal 316a contains a first material, and the second seal 316b contains a second material different from the first material.

This structure enables an optimum material for the positive electrode side and the negative electrode side to be selected in terms of reactivity or mechanical characteristics and can further improve the reliability of the battery.

Modified Example 7

Figure 8:
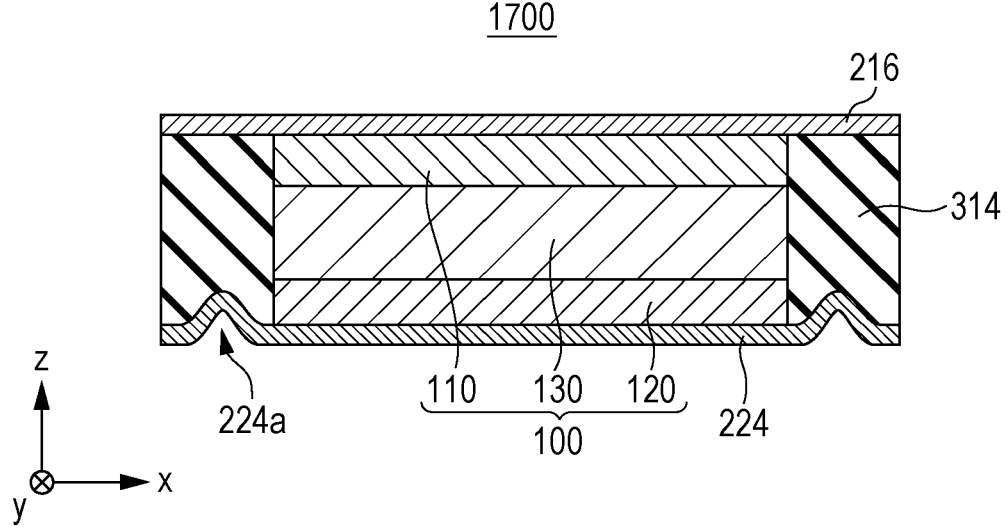
FIG. 8 is a schematic cross-sectional view of a battery according to Modified Example 7 of the first embodiment.

Next, Modified Example 7 of the first embodiment is described below with reference to FIG. 8. FIG. 8 is a schematic cross-sectional view of a battery 1700 according to Modified Example 7 of the first embodiment.

As illustrated in FIG. 8, the battery 1700 includes an electrode current collector 216 instead of the electrode current collector 214 in the battery 1300 according to Modified Example 3 and includes a counter electrode current collector 224 instead of the counter electrode current collector 220 in the battery 1300 according to Modified Example 3.

The electrode current collector 216 is different from the electrode current collector 214 in that the electrode current collector 216 is a flat sheet with a uniform thickness and has no recess. On the other hand, the counter electrode current collector 224 is different from the counter electrode current collector 220 in that the counter electrode current collector 224 has a recess 224a. The recess 224a is a rectangular loop along the seal 314 in the plan view.

The recess 224a in the counter electrode current collector 224 has the same effects as the recess 214a in the electrode current collector 214 of the battery 1300 according to Modified Example 3.

Modified Example 8

Figure 9:
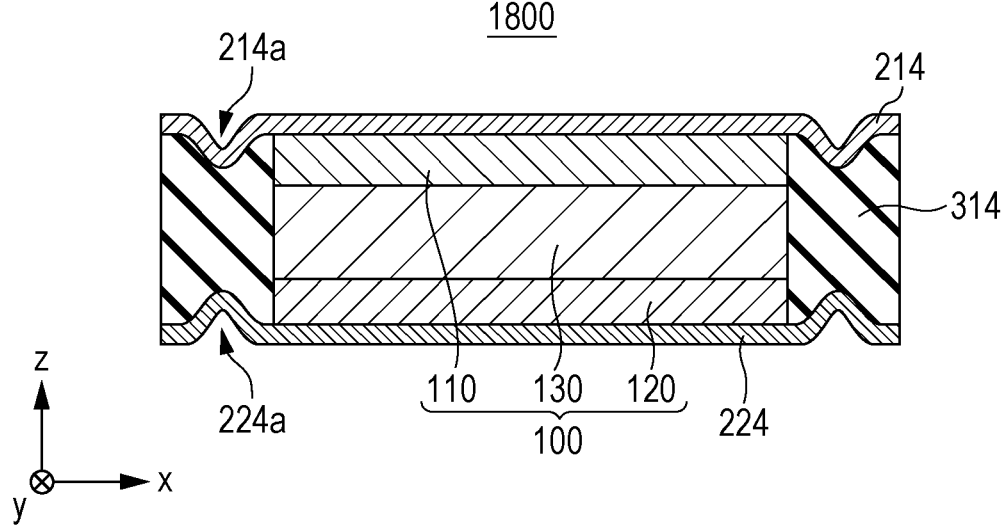
FIG. 9 is a schematic cross-sectional view of a battery according to Modified Example 8 of the first embodiment.

Next, Modified Example 8 of the first embodiment is described below with reference to FIG. 9. FIG. 9 is a schematic cross-sectional view of a battery 1800 according to Modified Example 8 of the first embodiment.

As illustrated in FIG. 9, the battery 1800 includes the counter electrode current collector 224 instead of the counter electrode current collector 220 in the battery 1300 according to Modified Example 3. Thus, the battery 1800 includes the electrode current collector 214 having the recess 214a and the counter electrode current collector 224 having the recess 224a.

Like this, both the electrode current collector 214 and the counter electrode current collector 224 may have a recess. Thus, in the first embodiment, at least one of the electrode current collector and the counter electrode current collector has a recess.

Method for Producing Battery

A method for producing a battery according to the first embodiment or a modified example thereof is described below. A method for producing the battery 1500 according to Modified Example 5 is described below with reference to FIG. 10. The batteries 1000, 1100, 1200, 1300, 1400, 1600, 1700, and 1800 can also be produced in the same manner.

Figure 10:
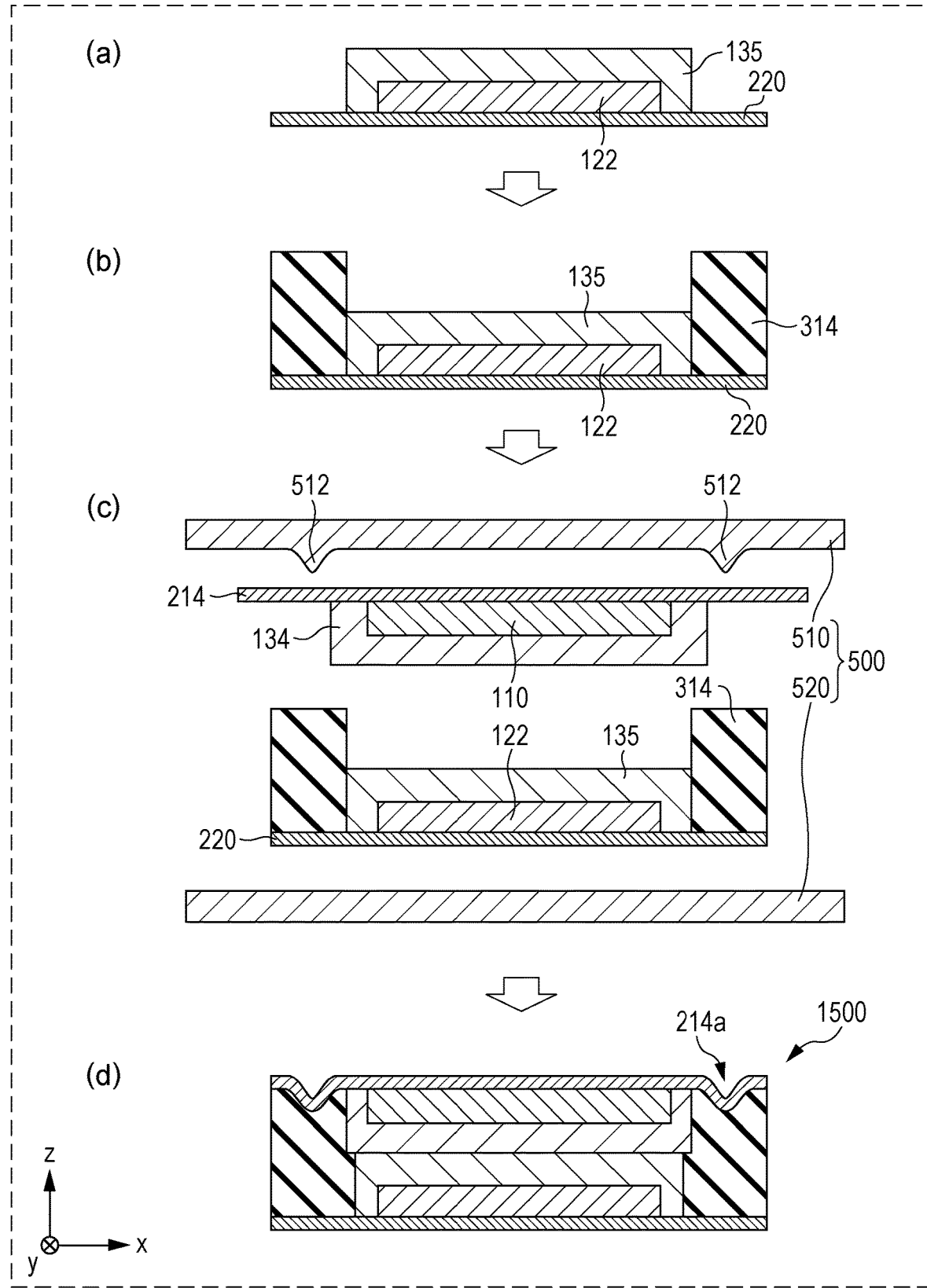
FIG. 10 is a schematic view illustrating a method for producing the battery according to the first embodiment.

FIG. 10 is a schematic view illustrating a method for producing the battery 1500.

First, a paste containing a counter electrode material in a solvent is prepared. The paste is applied to the counter electrode current collector 220 to form the counter electrode layer 122. A solid electrolyte material is then applied to the counter electrode layer 122 and the counter electrode current collector 220 and is dried to form the counter electrode side electrolyte layer 135. Thus, a counter electrode sheet illustrated in FIG. 10(a) is formed. A counter electrode material (and an electrode material described later) and a solid electrolyte material may contain no solvent.

As illustrated in FIG. 10(b), a first material is then applied to the periphery of the counter electrode sheet to form the seal 314. As illustrated in FIG. 10(b), the seal 314 may have a thickness smaller than the total thickness of the counter electrode layer 122, the counter electrode side electrolyte layer 135, the electrode layer 110, and the electrode side electrolyte layer 134.

After the sealing material is applied, the sealing material is subjected to heat treatment or ultraviolet radiation. Thus, the sealing material can be thickened while retaining flowability and can temporarily be cured. The deformation of the seal 314 can be controlled by thickening and curing.

Next, a paste containing an electrode material in a solvent is prepared. The paste is applied to the electrode current collector 214 to form the electrode layer 110. A solid electrolyte material is then applied to the electrode layer 110 and the electrode current collector 214 and is dried to form the electrode side electrolyte layer 134. Thus, an electrode sheet illustrated in FIG. 10(c) is formed. The electrode current collector 214 to which the paste is to be applied may be a flat sheet, as illustrated in FIG. 10(c). In other words, the recess 214a has not yet been formed on the electrode current collector 214.

As illustrated in FIG. 10(c), the electrode sheet and the counter electrode sheet are press-bonded using a pressing jig 500 composed of an upper jig 510 and a lower jig 520. More specifically, the electrode sheet is placed to face the counter electrode sheet on which the seal 314 is formed, and the electrode sheet and the counter electrode sheet are press-bonded between the upper jig 510 and the lower jig 520.

The upper jig 510 has a protrusion 512 on its surface facing the lower jig 520. Thus, the pressure bonding of the electrode sheet and the counter electrode sheet forms the recess 214a in the electrode current collector 214. The shape, position, and depth of the recess 214a in the electrode current collector 214 can be controlled by the shape, position, and height of the protrusion 512 on the upper jig 510. For example, as illustrated in FIG. 10(c), on the opposing surfaces of the upper jig 510 and the lower jig 520, the upper jig 510 has the protrusion 512 with a V-shaped cross section facing the seal 314. Thus, as illustrated in FIG. 10(d), in the battery 1500 after pressure bonding, the recess 214a corresponding to the shape of the protrusion 512 is formed in the region of the electrode current collector 214 in contact with the seal 314.

If the lower jig 520 has a protrusion facing the upper jig 510, a recess can be formed in the counter electrode current collector 220. If both the upper jig 510 and the lower jig 520 have a protrusion, a recess can be formed in both the electrode current collector 214 and the counter electrode current collector 220.

The recess 214a is not necessarily formed simultaneously with pressure bonding of the counter electrode sheet and the electrode sheet. For example, after pressure bonding of the counter electrode sheet and the electrode sheet, the electrode current collector 214 may be partly pressed to form the recess 214a. A recess in the counter electrode current collector 220 may be formed in the same way.

The seal 314 may be cured by heat treatment or UV radiation, for example. This can strengthen the seal.

The first material may be applied to both the electrode sheet and the counter electrode sheet. The seal 314 may be partly formed on the electrode sheet and the counter electrode sheet before the electrode sheet and the counter electrode sheet are bonded together. This can decrease the amount of the seal 314 formed at a time and increase the rate of formation of the seal 314. An increased bonding area results in a higher bonding strength between the seal 314 and the electrode sheet. A lower protrusion of the seal 314 makes it easier to coil the electrode sheet or the counter electrode sheet in the middle of the process. Furthermore, different optimum first materials may be selected for the electrode sheet and the counter electrode sheet.

As described above, a method for producing the battery 1500 illustrated in FIG. 10 includes forming the seal 314 before the electrode sheet and the counter electrode sheet are bonded together. Thus, the seal 314 is formed on the periphery of at least one of the electrode current collector 214 and the counter electrode current collector 220. This can significantly reduce the risk of a short circuit between the electrode layer 110 and the counter electrode layer 122 resulting from direct contact between the electrode current collector 214 and the counter electrode current collector 220.

The control of the thickness of the seal 314 contributes greatly to improved reliability of the battery 1500. The thickness of the seal 314 is controlled by changing the thickness of the first material to be applied. The seal 314 may be formed not to cover most of the ends of the electrode current collector 214 and the counter electrode current collector 220, that is, not to spread outward from the ends of the current collectors.

It is also possible to adjust the position of the seal 314 to be formed, the areas of the electrode layer 110, the counter electrode layer 122, and the electrolyte layer 133 to be formed, and the sizes of the electrode current collector 214 and the counter electrode current collector 220. The batteries according to the first embodiment and the modified examples can be produced in this way. A plurality of batteries may be stacked to produce a cell stack according to a second embodiment described later.

In a method for producing a battery according to the present embodiment, the electrode sheet and the counter electrode sheet may be pressed for bonding, or a plurality of batteries may be pressed for stacking. The electrode sheet or the counter electrode sheet may be individually pressed before the seal 314 is formed.

Second Embodiment

A second embodiment is described below. The following description focuses on the points of difference from the first embodiment and the modified examples, and points once described are not described again or are simply described thereafter.

Figure 11:
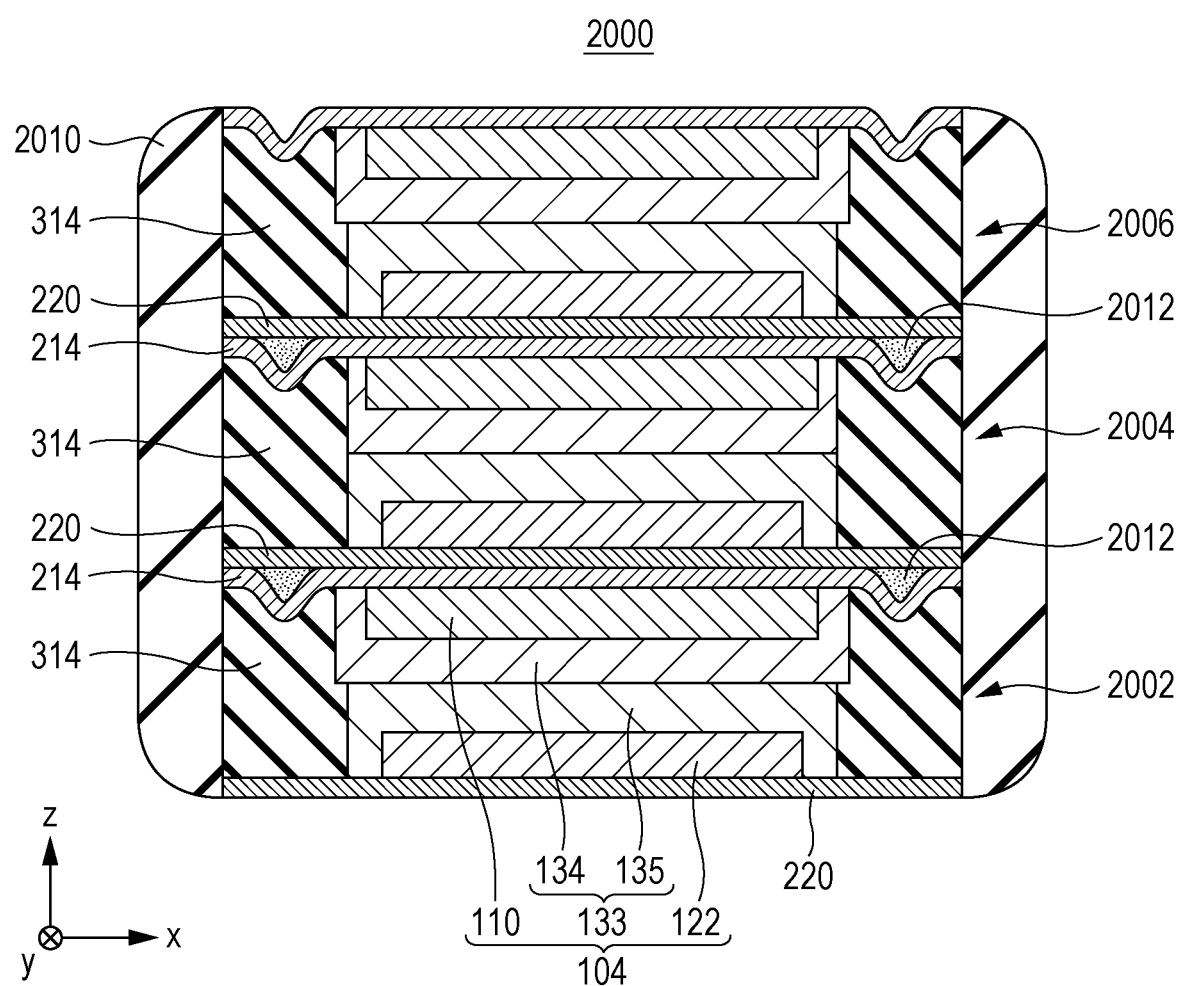
FIG. 11 is a schematic view of a cell stack according to a second embodiment.

FIG. 11 is a schematic cross-sectional view of a cell stack 2000 according to the second embodiment. In the cell stack 2000 according to the second embodiment, the batteries according to the first embodiment or a modified example thereof are stacked and coupled in series.

In FIG. 11, the cell stack 2000 includes three batteries 2002, 2004, and 2006 stacked in this order. The batteries 2002, 2004, and 2006 have the same structure. One of the batteries 2002, 2004, and 2006 corresponds to an example of the first battery, and another of the batteries 2002, 2004, and 2006 corresponds to an example of the second battery. The cell stack 2000 further includes an electrically insulating member 2010.

For example, the batteries 2002, 2004, and 2006 have almost the same structure as the battery 1500 according to Modified Example 5 of the first embodiment. At least one of the batteries 2002, 2004, and 2006 may be the battery 1000 according to the first embodiment or at least one of the batteries 1100 to 1800 according to Modified Examples 1 to 8.

In the cell stack 2000, an electrode current collector of a battery and a counter electrode current collector of another battery are bonded together to stack the batteries. More specifically, as illustrated in FIG. 11, the electrode current collector 214 of the battery 2002 is bonded to the counter electrode current collector 220 of the battery 2004. The electrode current collector 214 of the battery 2004 is bonded to the counter electrode current collector 220 of the battery 2006. The electrode current collector 214 and the counter electrode current collector 220 may be directly bonded together or may be bonded with an electrically conductive adhesive or by the welding method. The batteries 2002, 2004, and 2006 are connected in series.

The space formed by the recess 214a in the electrode current collector 214 of the battery 2002 between the electrode current collector 214 of the battery 2002 and the counter electrode current collector 220 of the battery 2004 is filled with a binder 2012 (or a bonding material). Thus, the recess 214a in the electrode current collector 214 of the battery 2002 is filled with the binder 2012. Likewise, the space formed by the recess 214a in the electrode current collector 214 of the battery 2004 between the electrode current collector 214 of the battery 2004 and the counter electrode current collector 220 of the battery 2006 is filled with a binder 2012. Thus, the recess 214a in the electrode current collector 214 of the battery 2004 is filled with the binder 2012. The binder 2012 is an electrically conductive adhesive, for example.

This structure can improve the adhesive strength (or bonding strength) between batteries without decreasing the volumetric capacity density of the cell stack 2000.

The electrically insulating member 2010 covers the side surfaces of the batteries 2002, 2004, and 2006. The electrically insulating member 2010 can further strongly maintain the stacked state of a plurality of batteries in the cell stack 2000. The electrically insulating member 2010 is formed of an electrically insulating resin material. The electrically insulating member 2010 may be formed of the material of the seal 314.

The cell stack 2000 may be composed of three or more batteries or may be composed of only two batteries. The number of batteries to be stacked can be changed to achieve the desired battery characteristics.

Depending on the required characteristics, a plurality of batteries in the cell stack may be connected in parallel. Two or more batteries connected in parallel may be mixed with two or more batteries connected in series. This can provide a high-capacity cell stack with a smaller volume.

In such a structure, a plurality of unit cells can be stacked in series to produce a high voltage. Thus, a series-connected cell stack can be provided that has a low short circuit risk and high electrical connection reliability. Thus, a series-connected stacked bipolar structure can be formed that has a low risk of a short circuit due to contact between current collectors, has a smaller external force acting on an end of the electric-power generating element 104, and has high electrical connection reliability.

Such a structure can reduce stress to the electric-power generating element 104 caused by an external force applied to ensure the connection between cell stacks or the connection between a cell stack and another component in an electric circuit and can prevent delamination or breakage of the electric-power generating element 104.

Figure 12:
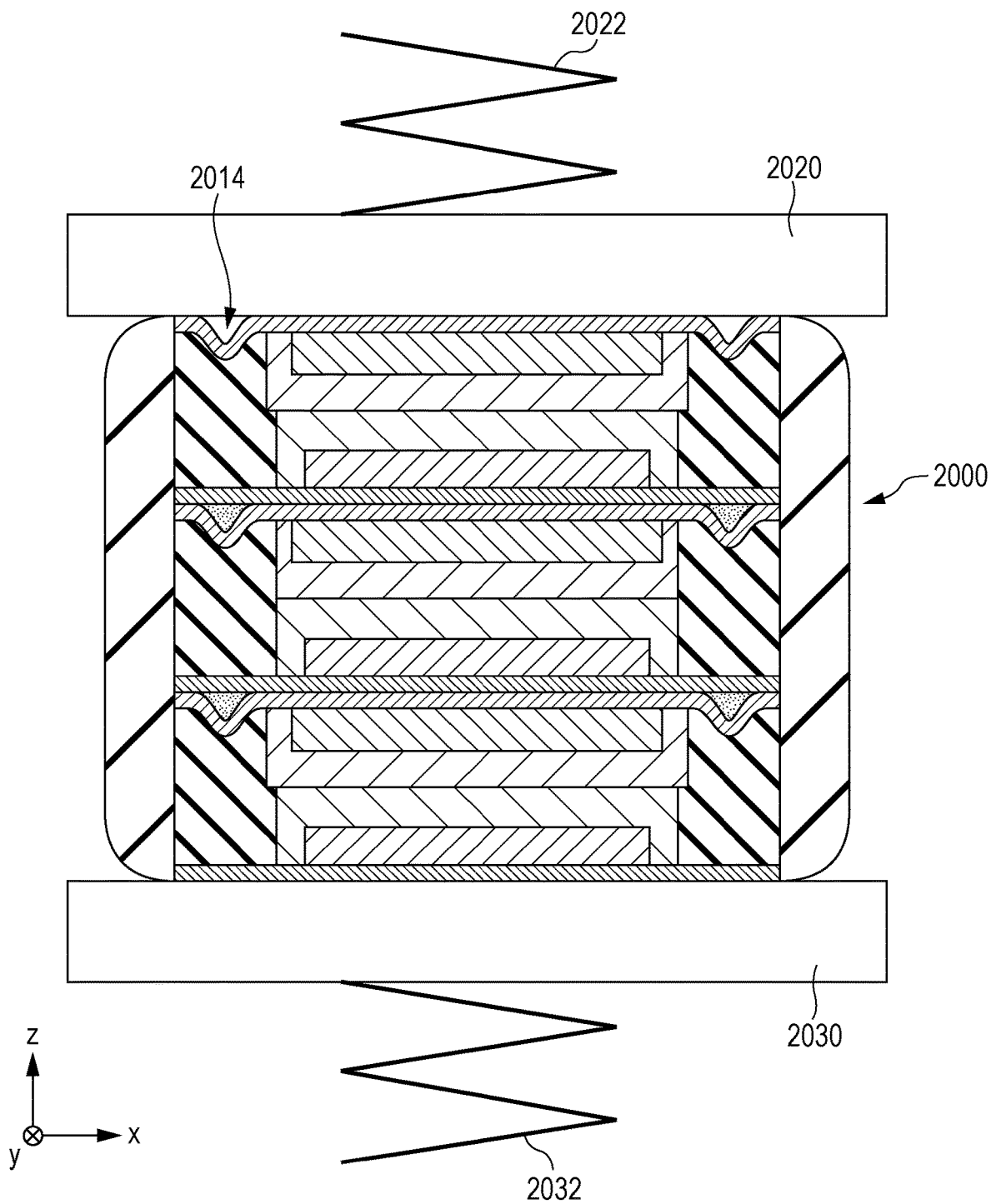
FIG. 12 is a schematic view of a usage example of the cell stack according to the second embodiment.

FIG. 12 is a schematic view of a usage example of the cell stack 2000 according to the second embodiment. As illustrated in FIG. 12, the cell stack 2000 is pressed between an electrode holder 2020 and a counter electrode holder 2030, for example. The electrode holder 2020 is coupled to an electrode lead 2022. The counter electrode holder 2030 is coupled to a counter electrode lead 2032. The electrode holder 2020, the counter electrode holder 2030, the electrode lead 2022, and the counter electrode lead 2032 are formed of an electrically conductive metallic material. An electric current can flow from the cell stack 2000 through the electrode lead 2022 and the counter electrode lead 2032.

A space 2014 is formed by the recess 214a between the electrode holder 2020 and the cell stack 2000. In this structure, when the cell stack 2000 has a volume change or generates a gas during use, the space 2014 can relieve stress caused by these phenomena. The cell stack 2000 (or a battery) between the electrode holder 2020 and the counter electrode holder 2030 can reduce the occurrence of delamination of the electric-power generating element and improve electrical connection during repeated use for extended periods.

The cell stack 2000 may be housed in a seal case. The seal case may be a laminated case, a metal can, or a resin case. The seal case can be used to prevent the electric-power generating element from being degraded by water.

Other Embodiments

Although the batteries and cell stacks according to one or more aspects have been described in the embodiments, the present disclosure is not limited to these embodiments. Various modifications of these embodiments and combinations of constituents of different embodiments conceived by a person skilled in the art without departing from the gist of the present disclosure are also fall within the scope of the present disclosure.

For example, in the embodiments, the seal may be separated from the electrode current collector. For example, the electrode layer may be formed over the entire surface of the electrode current collector, and the seal may be located between the electrode layer and the counter electrode current collector and may be in contact with the electrode layer.

Likewise, the seal may be separated from the counter electrode current collector. For example, the counter electrode layer may be formed over the entire surface of the counter electrode current collector, and the seal may be located between the counter electrode layer and the electrode current collector and may be in contact with the counter electrode layer.

For example, the seal may be separated from the electric-power generating element.

For example, the electrolyte layer may not be a solid electrolyte layer and may be an electrolyte solution.

Various modifications, replacement, addition, and omission may be made to the embodiments within the scope and equivalents of the appended claims.

What is claimed is:

1. A battery comprising:
   a unit cell, which includes an electrode layer and a counter electrode layer facing the electrode layer;
   an electrode current collector in contact with the electrode layer;
   a counter electrode current collector in contact with the counter electrode layer; and
   a seal between the electrode current collector and the counter electrode current collector,
   wherein the unit cell is disposed between the electrode current collector and the counter electrode current collector, and
   at least one selected from the group consisting of the electrode current collector and the counter electrode current collector has at least one recess facing the seal.

2. The battery according to claim 1, wherein
   the seal is in contact with the electrode current collector and the counter electrode current collector.

3. The battery according to claim 1, wherein
   the seal is in contact with the unit cell.

4. The battery according to claim 1, wherein
   the seal surrounds the unit cell.

5. The battery according to claim 1, wherein
   the at least one recess has a depth 1 to 100 times a thickness of the at least one selected from the group consisting of the electrode current collector and the counter electrode current collector.

6. The battery according to claim 1, wherein
   the at least one recess is located inside an end of the at least one selected from the group consisting of the electrode current collector and the counter electrode current collector.

7. The battery according to claim 1, wherein
   the at least one recess includes a plurality of recesses.

8. The battery according to claim 1, wherein
   a portion of the at least one recess is inclined at an angle of 15 degrees or more with respect to a main surface of the at least one selected from the group consisting of the electrode current collector and the counter electrode current collector.

9. The battery according to claim 1, wherein
   the unit cell includes a solid electrolyte layer between the electrode layer and the counter electrode layer.

10. The battery according to claim 9, wherein
    the solid electrolyte layer covers at least one selected from the group consisting of the electrode layer and the counter electrode layer.

11. The battery according to claim 10, wherein
    the solid electrolyte layer is in contact with at least one selected from the group consisting of the electrode current collector and the counter electrode current collector.

12. The battery according to claim 1, wherein
    when the battery is viewed in a thickness direction of the battery,
    the electrode current collector includes a first region that does not overlap the electrode layer, and the first region includes at least part of an outer circumference of the electrode current collector,
    the counter electrode current collector includes a second region that does not overlap the counter electrode layer, and the second region includes at least part of an outer circumference of the counter electrode current collector, and
    the seal overlaps the first region and the second region.

13. The battery according to claim 1, wherein
    the seal contains a first material, and
    the first material is an electrically insulating material having no ion conductivity.

14. The battery according to claim 13, wherein
    the first material contains a resin.

15. The battery according to claim 13, wherein
    the first material is at least one selected from the group consisting of epoxy resins, acrylic resins, polyimide resins, and silsesquioxanes.

16. The battery according to claim 1, wherein
    the seal contains a particulate metal oxide material.

17. The battery according to claim 1, wherein
    the seal includes a first seal containing a first material and a second seal containing a second material different from the first material,
    the first seal is located closer to the electrode current collector than the second seal is, and
    the second seal is located closer to the counter electrode current collector than the first seal is.

18. The battery according to claim 1, wherein
    the at least one recess is a linear or loop groove.

19. A cell stack comprising:
    a first battery; and
    a second battery on the first battery,
    each of the first battery and the second battery including:
    a unit cell, which includes an electrode layer and a counter electrode layer facing the electrode layer;
    an electrode current collector in contact with the electrode layer;

a counter electrode current collector in contact with the counter electrode layer; and a seal between the electrode current collector and the counter electrode current collector, wherein the unit cell is disposed between the electrode current collector and the counter electrode current collector, and at least one selected from the group consisting of the electrode current collector and the counter electrode current collector has at least one recess facing the seal.

20. The cell stack according to claim 19, wherein the at least one recess is filled with a binder.

\* \* \* \* \*